United States Patent [19]

Dubeck et al.

[11] 3,918,962

[45] Nov. 11, 1975

[54] PROCESS FOR WINNING COPPER USING CARBON MONOXIDE

[75] Inventors: Michael Dubeck, Birmingham; Suk Joong Im, Southfield, both of Mich.

[73] Assignee: Ethyl Corporation, Richmond, Va.

[22] Filed: Oct. 4, 1974

[21] Appl. No.: 512,331

Related U.S. Application Data

[63] Continuation-in-part of Ser. No. 267,241, June 28, 1972, Pat. No. 3,855,384.

[52] U.S. Cl. ............... 75/117; 75/.5 A; 75/.5 B; 75/72; 75/101 R; 75/108; 75/114; 75/121; 423/34; 423/42; 423/417

[51] Int. Cl.$^2$ ............... C22B 15/12

[58] Field of Search ............ 75/117, 72, 108, .5 A, 75/.5 B; 423/42, 34, 417

[56] References Cited

UNITED STATES PATENTS

| 924,076 | 6/1909 | Jumau | 75/117 |
|---|---|---|---|
| 924,077 | 6/1909 | Jumau | 75/117 |
| 940,292 | 11/1909 | Wells | 75/117 X |
| 2,647,825 | 8/1953 | Roberts | 75/.5 A |
| 3,701,648 | 10/1972 | Ashby et al. | 75/72 |
| 3,728,105 | 4/1973 | Skarbo | 75/103 |
| 3,855,384 | 12/1974 | Dubeck et al. | 423/42 |

*Primary Examiner*—G. Ozaki
*Attorney, Agent, or Firm*—Donald L. Johnson; Robert A. Linn

[57] ABSTRACT

Process of winning copper from chloride containing solutions by treating with carbon monoxide. Process makes copper separable from iron, and can be applied to leach solutions prepared by treating sulfide ores with HCl in the presence of air or oxygen.

12 Claims, No Drawings

PROCESS FOR WINNING COPPER USING CARBON MONOXIDE

CROSS-REFERENCE TO RELATED APPLICATION

This application is a Continuation-in-Part of copending application Ser. No. 267,241, filed June 28, 1972, now Pat. No. 3,855,384.

BACKGROUND OF THE INVENTION

Some copper ores such as bornite and chalcopyrite contain appreciable quantities of iron. For winning copper, it is desirable that the iron be separated. This invention pertains to separation of iron and copper values and to obtaining highly purified copper metal.

SUMMARY OF THE INVENTION

A process for winning copper which comprises reacting carbon monoxide with source copper values in the presence of chloride ions.

A process for winning copper from a solution containing a. source copper values in the cuprous or cupric ionic state
b. iron values, and
c. sufficient chloride ions to bond with substantially all cuprous ions in said solution;

said process comprising contacting said solution with carbon monoxide, to form a complex of copper chloride and carbon monoxide, removing the complex of copper chloride and carbon monoxide from the solution, decomposing said complex to copper chloride, and reducing the copper chloride to copper metal.

This process can be applied to separation of iron from copper values in a solution prepared by leaching a copper ore of the sulfide type with HCl, the leaching being conducted in the presence of oxygen-containing gas.

DESCRIPTION OF PREFERRED EMBODIMENTS

This invention comprises treating ionic copper with carbon monoxide. Although pure or substantially pure carbon monoxide can be used in the process, it is not necessary to do so. The carbon monoxide can be mixed with other gases such as hydrogen, nitrogen, methane, carbon dioxide, or water vapor. Synthetic gases which are mixtures of carbon monoxide with one of more of these diluent gases can be employed. Thus, the process can be conducted using producer gas, synthesis gas, water gas, and the like.

In many instances, better results are obtained if substantial amounts of oxygen are not permitted in the system. In general, the amount of oxygen normally present in any of the synthetic gases mentioned above can be used. Likewise, when conducting the process in a batch fashion in a pressure vessel, the liquid ingredients can be added to the vessel open in air, and then the carbon monoxide or carbon monoxide-containing gas can be added. In other words, it is not necessary to remove oxygen by a gaseous sweep.

In general, the amount of oxygen should not exceed about 5 weight percent of the gas phase.

The process is preferentially conducted under carbon monoxide pressure. In other words, although it may be possible in some instances to conduct the process at atmospheric pressure, generally, better results are achieved when super-atmospheric pressures of carbon monoxide are used. Preferably, the carbon monoxide pressure is greater than 10 and more preferably, greater than 100 psia. There is no real upper limit on the carbon monoxide pressure; and accordingly, the upper limit is restricted by such secondary considerations as design of the reaction vessel, economics, etc. In general, the process can be conducted at carbon monoxide pressures up to 5000 or more preferably, 2500 psia. In general, a most preferred carbon monoxide pressure range is from about 200 to about 1500 psia.

Generally, better results are obtained if the process is conducted at temperatures elevated above ambient. Temperatures within the range of from about 80° to about 300°C. can be used. Higher and lower temperatures can be used. A preferred range is from about 100° to about 250°C.

For the process, better results are achieved when it is conducted using metal values in the ionic state and in which an anionic portion of the metal salts consists of chloride ion. It is not necessary for all metal salts in the starting material to be chlorides. Better results are achieved, however, when there is at least one gram ion of chloride ion present per each gram ion or gram atom of copper. The ionic state of the copper in the starting material is not critical. Thus, one can initiate the process with cupric or cuprous copper. Of these, cuprous copper is preferred. Although this invention is not dependent on any theory, it is believed use of carbon monoxide will reduce cupric to cuprous copper during the gaseous treatment.

The resultant copper values obtained by this process generally have limited solubility in water. The resultant copper values can be in the form of white, lustrous flakes. These are a complex of carbon monoxide with cuprous chloride. This complex can be removed from the reaction mixture by filtration under pressure to retard its decomposition, if desired.

The reaction time is not critical, and it is dependent, at least to some extent, on the other reaction variables employed. In general, times are reduced as temperatures are elevated. In many instances good results are obtained when the carbon monoxide and copper values are allowed to react for a period of from about ½ to about 24 hours.

This invention is preferably conducted in the presence of a liquid phase to facilitate contacting the reactants. The most preferred liquid for this purpose is water. The pH is not critical and acid or neutral solutions can be used. The process proceeds well when at least a substantial portion of the copper values are in solution. Accordingly, the aqueous phase should not be so basic that copper values are precipitated from solution. The process proceeds very well when conducted using acidic solutions. Accordingly, it is not necessary to neutralize or partially neutralize any acid leach solution obtained by treating a copper-containing material. Thus, preferably, one can operate at a pH of from about 1 to about 7, but is not necessary to do so.

Carbon monoxide can be used to separate copper ions from any aqueous solution. However, this invention is directed, in a primary sense, to carbon monoxide treatment of source copper values obtained from some source of copper such as copper ore, copper scrap, and the like. The ores may be oxides or carbonates and may be of the sulfide type. Typical sulfide copper ores are those selected from the class consisting of covellite, enargite, tetrahedrite, tennantite, bornite, chalcopyrite and chalcocite. Of these, bornite and chalcopyrite are preferred. Chalcopyrite is a most preferred copper ore.

The relative amounts of water and source copper values is not critical. Any material from very dilute to concentrated solutions can be used. Likewise, slurries can be employed. In general, the concentration of copper is from about 0.1 grams per liter to about 100 grams per liter, and more preferably, from about 20 to about 80 grams per liter.

The process of this invention is efficaciously employed by using solutions of source copper values obtained by leaching a copper ore of the above type with HCl in the presence of an oxygen-containing gas. The HCl may be hydrochloric acid or hydrogen chloride gas. Either of these agents is used in treating a water slurry of copper mineral concentrate obtained from the above-identified ores. Preferably, this leach process is conducted at about atmospheric pressure and elevated temperature. Preferred temperatures are from about 95° to 105°C. The oxygen-containing gas can be pure oxygen, air or a mixture of oxygen and air.

EXAMPLE

To illustrate the feasibility of this invention, a test was carried out to produce the carbon monoxide complex with cuprous chloride utilizing carbon monoxide and cupric chloride solution. The solution contained 58.9 grams per liter copper and 50.6 grams per liter iron. This test solution simulates copper-iron containing solutions available by treatment with sulfide copper concentrates. Treatment of the above-identified solution at 170°C. using a pressure of carbon monoxide of 445 psia for two hours yielded 60 percent of the copper as the complex of carbon monoxide with cuprous chloride. When washed, this material contained about 0.05 Fe.

Similar results are obtained when the process is conducted at temperatures of from about 100° to about 250°C. and at carbon monoxide pressure of from about 100 to about 1500 psia. Similar results are obtained when the concentration of copper is from about 20 to about 80 grams per liter and the concentration of iron is from about 40 to about 80 grams per liter. Similar results are obtained when the process is conducted at the temperatures and pressures noted from a period of about ½ to about 24 hours. Similar results are obtained at the times, temperatures and pressures noted above when substantially pure carbon monoxide is employed, or the carbon monoxide is added in producer gas, synthesis gas, or water gas.

The complex of carbon monoxide and cuprous chloride produced by the process of this invention can be heated to drive off the carbon monoxide. Then the cuprous chloride remaining can be reduced to copper as, for example, with hydrogen.

The above example can be applied, and similar results obtained, to treatment of leach solutions obtained by HCl treatment with oxygen of the sulfide ores listed above. Similar results are obtained by treating similar leach solutions made from oxide, carbonate, and silicate ore such as chrysocolla, malachite, azurite, cuprite and tenorite.

Similar results can be obtained by using the method of the above example in treating the leach solutions obtained with HCl and air and an ore concentrate having the following composition:

A. Principal Minerals

Cubanite — $Cu_2S.Fe_4S_5$
Chalcopyrite — $CuFeS_2$
Pentlandite — $(Ni,Fe)_9S_8$
Pyrite — $FeS_2$
Pyrrhotite — $Fe_{x-1}S_x$

B. Typical Cu and Ni Content

Cu - to about 12%
Ni - to about 5%

C. Average Assay, One Sample

Cu = 12.5%
Ni = 2.68%
Fe = 32.8%

Insolubles = 22.6%

S = 24.4%
Co = 0.14%
C = 0.81%

The complex of carbon monoxide and cuprous chloride produced by the aforedescribed process can be separated from the iron containing liquors by filtration. The precipitate, the complex of carbon monoxide and cuprous chloride can be heated to drive off carbon monoxide and leave cuprous chloride according to the proposed equation $Cu_2Cl_2CO.H_2O$  $Cu_2Cl_2 + CO + H_2O$.

The decomposition of the complex of cuprous chloride and carbon monoxide proceeds very readily at temperatures just above ambient and at atmospheric pressures, and, therefore, extreme conditions of temperature and pressure need not be used. Thus, for example, at 25°C. and at atmospheric pressure the complex of cuprous chloride and carbon monoxide will decompose to cuprous chloride in about two hours. By raising the temperature to 60°C., while keeping the pressure at one atmosphere, the complex will decompose to cuprous chloride and carbon monoxide in about thirty minutes. Although the decomposition proceeds quite readily at atmospheric pressures, super atmospheric pressure can be used. The carbon monoxide can be recycled to produce more carbon monoxide and cuprous chloride complex according to the above described process.

The cuprous chloride obtained from the decomposition of the complex of carbon monoxide and cuprous chloride can be reduced by heating in the presence of an appropriate reducing agent to give copper metal of exceedingly high purity. Two methods of reducing copper chloride to produce pure copper are heating the cuprous chloride in the presence of a reducing gas such as hydrogen, carbon monoxide, or synthesis gas, and heating the cuprous chloride in the presence of carbon and water.

According to the first method the copper chloride precipitate is heated in the presence of a reducing gas at elevated temperatures to reduce the copper chloride to copper metal. The process can be conducted under hydrogen or other reducing gas pressure. In other words, although it is possible to conduct the process at atmospheric pressure, it is also possible to conduct the process at super-atmospheric pressure. Generally, better results are obtained when super-atmospheric pressures of reducing gas are used. Preferably, the reducing gas pressure is greater than 100 psia, more preferably in the range of from about 200 to about 1500 psia. There is no real upper limit on the reducing gas pressure; and accordingly the reducing gas pressure is not critical. The upper pressure limit is restricted by such secondary considerations as design of the reaction vessel, economics, etc.

Likewise, the time of the reaction and the temperature at which the reduction is carried out are not critical. Generally, the temperatures should be above about 100°C. Preferably the temperature is between 130° and 650°C. As with the pressure, the temperature at which the reaction is carried out is not critical, but should be sufficient for the reaction to proceed at a reasonable rate. As a general rule the time of the reaction depends upon the factors of temperature and pressure. The higher the temperature the quicker the reduction, and conversely, the lower the temperature, the longer the time required for reduction of the cuprous chloride to copper metal.

In one example, a sample of cuprous chloride was reduced to copper metal with hydrogen at atmospheric pressure by heating at about 400°–440°C. for two hours. The copper metal thus obtained was 99.9% pure.

When heating the copper chloride in the presence of carbon and water, pressures of about one atmosphere or higher can be used in conjunction with temperatures of about 650°C. As with a reducing gas, the pressure is not critical and is limited, at its upper limits, only by such secondary considerations as design of the reaction vessel, economics, etc.

An advantageous process wherein the volatilization of unreacted cuprous chloride is reduced and which allows easier handling of the cuprous chloride material involves making pellets of cuprous chloride and carbon. These pellets can vary in size from about 1/8 of an inch to about 2 inches in diameter, with the most preferred size being about ½ of an inch. The cuprous chloride in these pellets is reduced to copper metal by contacting the pellets with steam. Alternately, the pellets can be contacted with a mixture of steam and carbon monoxide.

We claim:

1. A process for recovering copper metal from an acidic solution containing copper ions, iron ions and chloride ions which comprises
    1. treating said solution with a carbon monoxide containing gas at elevated temperatures and pressures for a time sufficient to form a copper-containing complex as a precipitate,
    2. separating said precipitated complex from said solution,
    3. heating said precipitated complex to obtain copper chloride, and
    4. reducing said copper chloride, whereby copper metal of high purity is obtained.

2. A process of claim 1 wherein said solution is an aqueous solution.

3. A process of claim 2 wherein there is at least one gram ion of chloride ion available for bonding with each gram atom of said copper ions.

4. A process of claim 3 wherein said copper ions are in the cuprous valence state.

5. A process of claim 3 being conducted under carbon monoxide pressure of from about 100 to about 1500 psia.

6. A process of claim 1 wherein the copper chloride is cuprous chloride.

7. A process of claim 6 wherein the cuprous chloride is reduced by heating in the presence of a reducing agent.

8. A process of claim 7 wherein the reducing agent is a gas selected from the group consisting of hydrogen, carbon monoxide, or synthesis gas.

9. A process of claim 6 wherein the cuprous chloride is heated in the presence of carbon and steam.

10. The process of claim 6 further including forming pellets of cuprous chloride and carbon.

11. The process of claim 10 wherein said pellets are treated with steam.

12. The process of claim 10 wherein said pellets are exposed to a mixture of steam and carbon monoxide.

* * * * *

UNITED STATES PATENT AND TRADEMARK OFFICE
CERTIFICATE OF CORRECTION

PATENT NO. : 3,918,962
DATED : November 11, 1975
INVENTOR(S) : Michael Dubeck et al It is certified that error appears in the above-identified patent and that said Letters Patent are hereby corrected as shown below:

Column 1, line 47, "of" (second instance) should be -- or --

Column 4, line 27, the equation "$Cu_2Cl_2CO \cdot H_2O \xrightarrow{\Delta} Cu_2Cl_2 + CO + H_2O$" should be -- $Cu_2Cl_2 \cdot CO \cdot H_2O \xrightarrow{\Delta} Cu_2Cl_2 + CO\uparrow + H_2O$ --

Signed and Sealed this sixteenth Day of March 1976

[SEAL]

Attest:

RUTH C. MASON
Attesting Officer

C. MARSHALL DANN
Commissioner of Patents and Trademarks